(12) United States Patent
Ireland

(10) Patent No.: US 9,883,005 B2
(45) Date of Patent: Jan. 30, 2018

(54) SYSTEMS AND METHODS FOR MANAGING COMMUNICATIONS ACROSS MULTIPLE IDENTITIES

(71) Applicant: TRUTEXT, INC., Vacaville, CA (US)

(72) Inventor: Ronald Ireland, Vacaville, CA (US)

(73) Assignee: TRUTEXT, INC., Vacaville, CA (US)

( * ) Notice: Subject to any disclaimer, the term of this patent is extended or adjusted under 35 U.S.C. 154(b) by 155 days.

(21) Appl. No.: 15/048,916

(22) Filed: Feb. 19, 2016

(65) Prior Publication Data

US 2016/0212235 A1 Jul. 21, 2016

Related U.S. Application Data

(63) Continuation of application No. 14/845,251, filed on Sep. 3, 2015, now Pat. No. 9,271,131, which is a
(Continued)

(51) Int. Cl.
- *H04W 4/14* (2009.01)
- *H04L 29/08* (2006.01)
(Continued)

(52) U.S. Cl.
CPC .......... *H04L 67/306* (2013.01); *G06Q 10/10* (2013.01); *G06Q 50/01* (2013.01); *H04L 12/1859* (2013.01); *H04L 51/14* (2013.01); *H04L 51/36* (2013.01); *H04L 51/38* (2013.01); *H04L 61/1594* (2013.01); *H04W 4/14* (2013.01)

(58) Field of Classification Search
CPC ... H04L 61/1594; H04L 67/306; H04L 51/36; H04L 51/38; H04L 12/1859; H04L 51/14; H04W 14/04; G06Q 50/01; G06Q 10/10
See application file for complete search history.

(56) References Cited

U.S. PATENT DOCUMENTS

| | | | |
|---|---|---|---|
| 2003/0101343 A1 | 5/2003 | Eaton et al. | |
| 2004/0096043 A1* | 5/2004 | Timmins | H04M 3/53366 379/88.22 |

(Continued)

FOREIGN PATENT DOCUMENTS

| | | |
|---|---|---|
| EP | 2071507 A1 | 6/2009 |
| WO | 2013121200 A1 | 8/2013 |

OTHER PUBLICATIONS

International Search Report and Written Opinion dated Dec. 9, 2014, in corresponding International Application No. PCT/US2014/053591, 7 pages.

*Primary Examiner* — Ted Wang
(74) *Attorney, Agent, or Firm* — Procopio, Cory, Hargreaves and Savitch LLP

(57) ABSTRACT

Electronic communications are managed across multiple identities. A user is able to create an account as well as any desired, required, or appropriate number of profiles under the account. Text messages are exchanged between users using specific profiles. For example, some text messages can be exchanged using a personal profile while other text messages need to be exchanged using a professional profile. In some instances, exchanged text messages are saved to a centralized archive. As such, one or both of the users involved in an exchange can request to retrieve some or all of the exchanged messages at a later time.

20 Claims, 6 Drawing Sheets

Related U.S. Application Data continuation-in-part of application No. 14/473,965, filed on Aug. 29, 2014, now Pat. No. 9,271,130.

(60) Provisional application No. 61/875,654, filed on Sep. 9, 2013, provisional application No. 61/875,656, filed on Sep. 9, 2013, provisional application No. 61/875,663, filed on Sep. 9, 2013.

(51) Int. Cl.
  *H04L 12/58* (2006.01)
  *G06Q 50/00* (2012.01)
  *H04L 29/12* (2006.01)
  *H04L 12/18* (2006.01)
  *G06Q 10/10* (2012.01)

(56) References Cited

U.S. PATENT DOCUMENTS

| | | |
|---|---|---|
| 2009/0296641 A1 | 12/2009 | Bienas et al. |
| 2012/0059900 A1 | 3/2012 | Caunter et al. |
| 2012/0079045 A1 | 3/2012 | Plotkin |
| 2012/0271883 A1 | 10/2012 | Montoya et al. |
| 2013/0282438 A1 | 10/2013 | Hunter et al. |
| 2014/0370879 A1 | 12/2014 | Redding et al. |

* cited by examiner

SYSTEMS AND METHODS FOR MANAGING COMMUNICATIONS ACROSS MULTIPLE IDENTITIES

RELATED APPLICATION INFORMATION

This application is a continuation of application Ser. No. 14/845,251, filed on Sep. 3, 2015, which is a continuation-in-part of co-pending U.S. patent application Ser. No. 14/473,965, filed on Aug. 29, 2014, which claims benefit of provisional applications 61/875,654, filed on Sep. 9, 2013, 61/875,656, filed on Sep. 9, 2013 and 61/875,663, filed on Sep. 9, 2013, the disclosures of which are incorporated herein in their entirety.

BACKGROUND

1. Technical Field

The embodiments described herein are related to electronic communications and more specifically to managing multiple identities for use in electronic communication, such as text based communication.

2. Related Art

Text messaging, or texting, generally refers to the act of sending brief, electronic messages between two or more devices (e.g., portable devices such as mobile phones) over a telephone network. Although the term initially referred to messages sent using Short Message Service (SMS), it has grown to encompass Multimedia Message Service (MMS) messages that contain a wide ranging variety of content including images, videos, and sound. In many situations, sending a text message can be far more convenient and discreet than placing a phone call. Indeed, texting has steadily supplanted voice calls as a choice means of communication. By 2007, monthly texting activities have already outpaced phone calls, and as of 2012, some 80 percent of mobile phone users report using their devices for texting. In fact, texting is no longer relegated to just casual or informal exchanges, and have become prevalent even in business and professional contexts. But despite texting messaging's skyrocketing popularity, conventional SMS systems still struggle with a number of significant limitations.

First, each mobile phone is typically assigned a unique phone number (e.g., a ten digit numeric string in the United States). With a conventional SMS message, the identities of both the sender and the recipient are generally tied to the phone number associated their respective mobile phones. Neither party in the exchange has control or flexibility over their respective identities. As one example, imagine that one user, Alice, is sending a text message to another user, Bob. On the one hand, the sending device relies on the phone number of the receiving device in order to dispatch the text message to the correct destination. Thus, in this example, Alice would need to have Bob's phone number in order to send the text message to Bob's mobile phone. Meanwhile, a receiving device will almost always be able to attribute an incoming text message to the phone number associated with the sending device. So when Alice's text message is delivered, Bob's mobile phone can recognize and inform Bob that the text message had originated from Alice's mobile phone. To maintain more than one identity (e.g., work, personal), a user must have separate devices and a different phone number for each, since a single phone number cannot ported back-and-forth or otherwise shared between multiple active devices. In practice, most people resort to carrying one device for work and another device for personal communications. So depending on whether Alice wishes to text her colleague Bob or her friend Charlie, Alice will need to switch between a work phone (and number) and a personal phone (and number).

Furthermore, many social and commercial situations warrant a disclosure or exchange of contact information although some or all of the parties involved only expect or desire to stay in touch in the short-term. Phone numbers, even temporary or disposable ones (e.g., burner phones), should not be divulged indiscriminately in these situations since they are generally inconvenient and costly to set up and change. As one example, suppose Alice is holding a garage sale. Alice would like perspective shoppers to be able to contact her but only for the duration of the sale. Nevertheless, it would be impractical for Alice to set up a temporary phone number just for the garage sale but she is also loath to publicize her personal phone number when advertising her garage sale.

Conventional SMS systems also do not adequately support conversations conducted between large groups of individuals. To the extent that a SMS message can be addressed to multiple recipients, group conversations conducted via SMS tend take place only between existing acquaintances (e.g., friends, family, and colleagues). This is because the sender of a SMS message must be privy to the phone number of every participant in a group conversation, whether the SMS message is being sent directly from one mobile phone to another or through a SMS gateway (e.g., SMS messages sent and received as emails at a computer terminal). Consider, for instance, a large gathering such as a sporting event or a concert. Although many people would welcome the prospect of engaging in a group conversation with others attendees (e.g., to share personal thoughts and commentaries), it remains largely undesirable and impractical to have to share private phone numbers with numerous strangers.

SUMMARY

A platform that manages communications across multiple identities.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The embodiments disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these example embodiments, or any other implementations, may be referred to as techniques. In general, the order of the steps of disclosed processes may be altered. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of operation. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the systems and methods described herein are directed toward a platform that manages communications across multiple identities. In particular, in various embodiments, the platform enables individual users to establish, maintain, and utilize a plurality (e.g., two or more) of identities or profiles under a single account. In various embodiments, some or all of the identities are used for text-based communication, including the sending and the receipt of text messages. It is to be understood that a text message can include one or more different types of data, including but not limited to images, videos, and sound. It is further to be understood that one or more different types of data can be inserted in or attached to a text message transmitted via the platform, including but not limited to images (e.g., .GIF, .JPEG, .BMP), files (e.g., .DOC, .PDF, .XLS, .PPT), hyperlinks, and emoticons.

Figure 1:
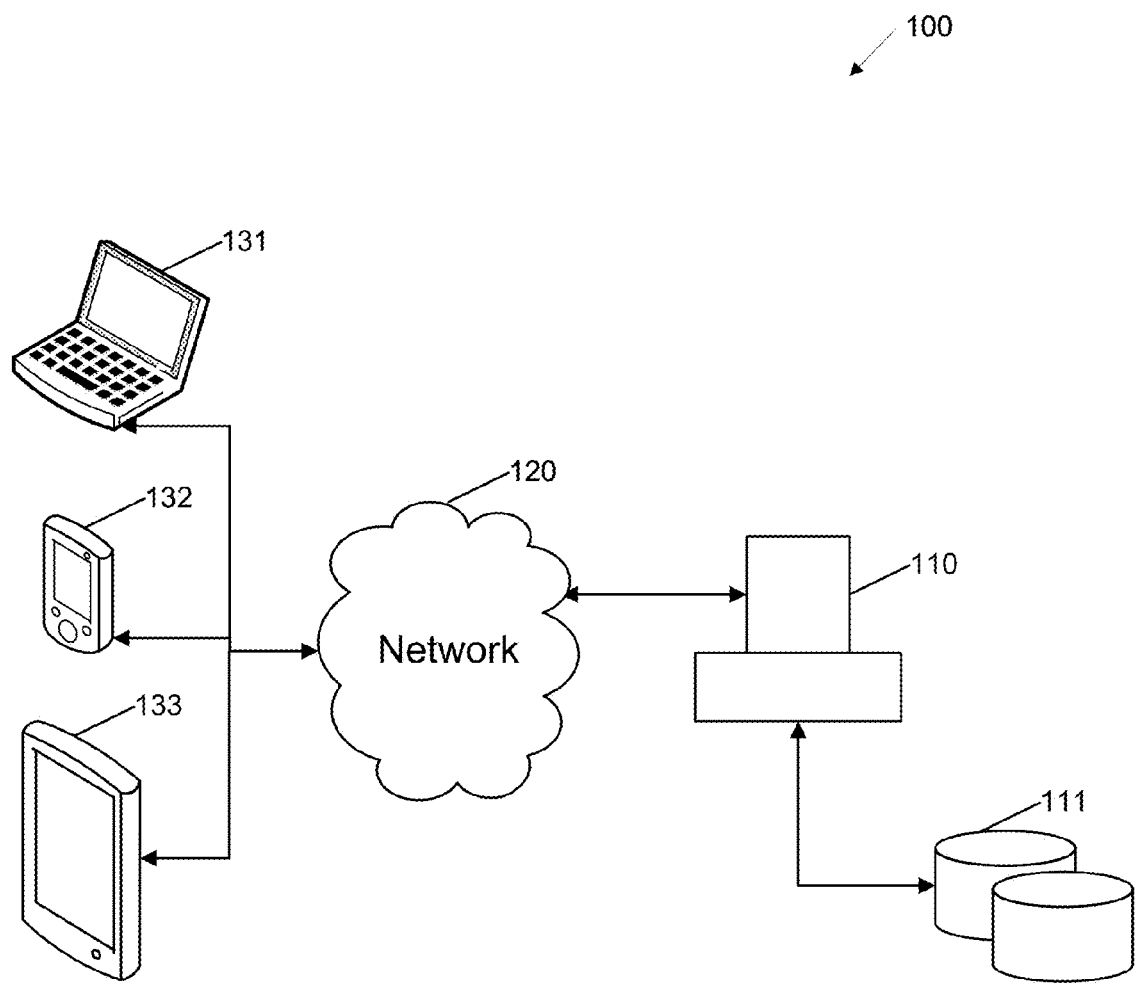
FIG. 1 is a block diagram illustrating a system for managing communications across multiple identities according to various embodiments.

FIG. 1 is a block diagram illustrating a system 100 for managing communications across multiple identities according to various embodiments. In various embodiments, the system 100 includes a platform 110 that communicates with a plurality of devices over a network 120. In various embodiments, the network 120 comprises one or more of a wired network, a wireless network, a local area network, a wide area network, the Internet, or any other appropriate network. For example, in FIG. 1, the platform 110 is shown to communicate with a first device 131 (e.g., a laptop), a second device 132 (e.g., a smartphone), and a third device 133 (e.g., a tablet PC). Although only three devices (e.g., the first device 131, the second device 132, and the third device 133) are shown in FIG. 1, it is to be understood that the platform 110 is capable of communicating with any number of devices. Furthermore, it is to be understood that the platform 110 is capable of communicating with a variety of different types of devices, including but not limited to the three that are shown in FIG. 1 (e.g., laptop, smartphone, tablet PC).

In various embodiments, the platform 110 acts as an intermediary that routes text messages communicated between the first device 131, the second device 132, and the third device 133. For example, suppose that the user of the first device 131, Alice, sends a text message to the users of the second device 132 and the third device 133, Bob and Charlie respectively. In various embodiments, the text message is not delivered directly to the second device 132 and the third device 133. Instead, the text message is transmitted first to the platform 110 before the platform 110 routes the text message to the second device 132 and the third device 133. As will be described in more detail below, in various embodiments, the platform 110 is configured to provide a service enabling the users (e.g., Alice, Bob, and Charlie) of at least some of the first device 131, the second device 132, and the third device 133 to communicate (e.g., send and receive text messages) using more than one identity. Further as will be described in more detail below, in various embodiments, at least some users of the first device 131, the second device 132, and the third device 133 (e.g., Alice, Bob, and Charlie) can subscribe or sign-up to the service and then communicate (e.g., send and receive text messages) with other service subscribers and non-service subscribers using multiple identities. Finally, in various embodiments, the platform 110 can further act as a gateway for both incoming and outgoing text messages. Otherwise stated, in various embodiments, messages can be sent and received in any desired, required, or appropriate communications format or protocol, including but not limited to text messages and emails. Meanwhile, in various embodiments, the same profile name or handle can be used to send and to receive messages regardless of the transmission formats or protocols. For example, Alice can choose to send a message to Bob as either an email or a text message. In some embodiments, the platform 110 will automatically convert and deliver as an email any text messages that exceeds a certain maximum length (e.g., greater than 160 characters).

In various embodiments, the platform 110 stores at least some of the test messages communicated between various devices, including the first device 131, the second device 132, and the third device 133. As shown in FIG. 1, the platform 110 further communicates with a database 111. In various embodiments, the platform 110 is configured to archive at least some of the text messages routed through the platform 110 in the database 111. For example, in various embodiments, the platform 110 stores the text messages from Alice to both Bob and Charlie in the database 111. As will be described in more detail below, the platform 110 is configured to provide archival functions (e.g., latent access) to at least some of the text messages archived in the database 111.

Multi-Profile Account

The various embodiments of the systems and methods described herein are directed toward a platform (e.g., the platform 110 described with respect to FIG. 1) that provides a service enabling subscribers to the service to communicate (e.g., send and receive text messages) using multiple identities. In particular, in various embodiments, a single account can be set up to include multiple subordinate profiles. In various embodiments, each profile corresponds to a different identity and can be designated, assigned, or otherwise associated with a distinctive profile name or handle. In various embodiments, a user can use different profiles to communicate with different contacts. In contrast, one email account is generally associated with only a single email address. Similarly, a mobile phone is always associated with only one telephone number.

In the various systems and methods described herein, users are able to maintain multiple profiles and access these profiles from different devices. Otherwise stated, in various embodiments, an account is not confined to a single profile nor is a profile necessarily tied to any single device. In fact, in various embodiments, a user has the ability to establish then simultaneously maintain and utilize an unlimited number of profiles and corresponding identities. Alice, for instance, can set up one account with at least two separate profiles. One profile (e.g., Alice@TruText.com) can be used to communicate with her friends and family and another (e.g., Alice.Jones.Esq@TruText.com) can be used to communicate with her colleagues at work. As such, in various embodiments, text messages that are transmitted using a specific profile are communicated based on the corresponding profile name or handle instead of, for example, the phone number of the sending or receiving mobile phone. For example, suppose Alice sends her friend Bob a text message using, Alice@TruText.com, the profile she had set up to communicate with friends and family. When the text message is delivered to Bob, Bob's device (e.g., smartphone) would inform Bob that the text message is from Alice@TruText.com regardless of the device Alice had used to send the text message. Should Bob subsequently respond to Alice's text message, that text message would be addressed to Alice@TruText.com and be displayed to Alice as a communication thread under her personal profile. Advantageously, in various embodiments, every profile under one account can be accessed collectively from any one of a user's devices. That is, in various embodiments, the user can very quickly and easily toggle between different profiles. For example, after Alice sends one text message to Bob as Alice@TruText.com, she can switch to her Alice.Jones.Esq@TruText.com profile to send a second text message to Charlie and then immediately return to her conversation with Bob, all from the same device. On the other hand, to send conventional SMS text messages from different phone numbers would entail a manual switch from one device to another.

In various embodiments, an account is established as a result of an initial registration, subscription, or sign-up process to the service. As such, in various embodiments, registering, subscribing, or signing up to the service generates a general, umbrella, or otherwise all-inclusive account that provides a single point of nexus to a plurality of subordinate profiles. Advantageously, in various embodiments, multiple profiles can be managed and manipulated at once via the account, including but not limited to adding, removing, and temporarily decommissioning one or more profiles on the account. Furthermore, in various embodiments, the account and every profile under the account can be established, maintained, and utilized via from any number of different devices. In some embodiments, as part of the initial registration or sign-up process, a user can designate one or more devices that will be used to access the account.

For example, suppose Alice has three different devices: a smartphone, a tablet PC, and a laptop. Instead of tying an account or any profile under the account to a specific device, in various embodiments, Alice is able to access to identical features and functionalities (e.g., send and receive text messages, add and remove profiles) with respect to her account and all of her profiles from any one of her devices. To illustrate, in various embodiments, Alice is able to send and receive text messages using her personal profile, Alice@TruText.com, whether she is on her smartphone, tablet PC, and laptop.

Figure 2:
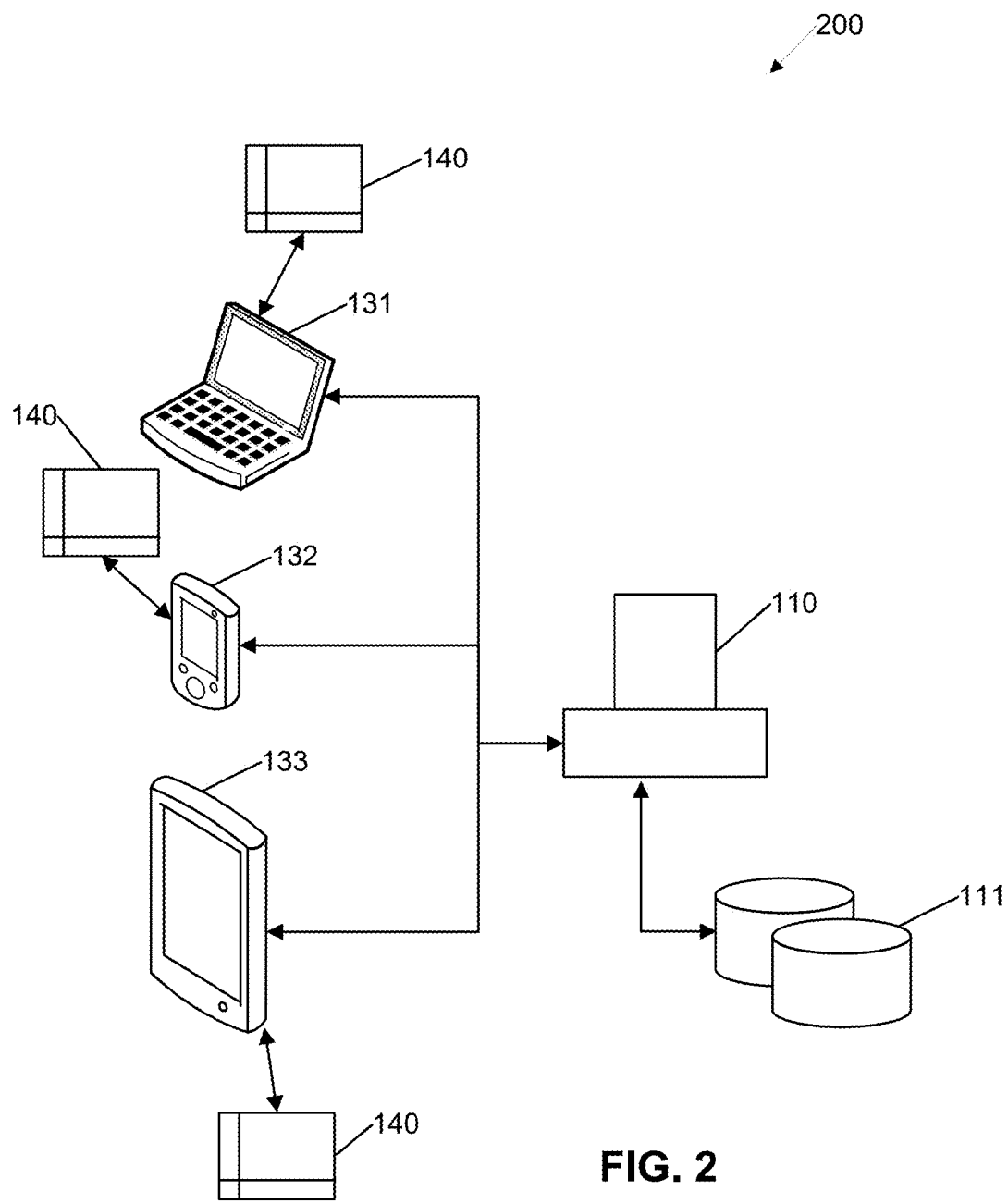
FIG. 2 is a network diagram illustrating a network environment according to various embodiments.

FIG. 2 is a block diagram illustrating an embodiment of a network environment 200 according to various embodiments. Referring to FIG. 2, the network environment 200 includes multiple devices that may be used with respect to a single multi-profile account.

As shown in FIG. 2, a user has configured the first device 131, the second device 132, and the third device 133 for use with respect to the multi-profile account. In various embodiments, the user configures a (e.g., the first device 131, the second device 132, and the third device 133) by downloading and installing a copy of an application 140 on the device. In various embodiments, the application 140 provides a user interface that enables a variety of interactions with the multi-profile account. For example, Alice can use the the application 140 that is installed on her smartphone, the second device 132, to send a text message to her friend Bob using one profile (e.g., Alice@TruText.com) as well as to send a text message to her colleague Charlie using her other profile (e.g., Alice.Jones.Esq@TruText.com). Alternately, Alice can also use the same the application 140 installed on her laptop (e.g., the first device 131) or tablet PC (e.g., the third device 133) to send and receive text messages using any one of her two profiles. In various embodiments, the application 140 provides additional features and functions that can be triggered, invoked, or otherwise applied with respect to the multi-profile account, including but not limited to options to edit (e.g., add, remove, suspend) the profiles on Alice's account. As will be discussed in more detail below, the application 140 also provides an interface for a user to interact with earlier text messages that have been archived in the database 111. In various embodiments, since the application 140 is installed on each one of the first device 131, the second device 132, and the third device 133, these additional features and functions are available on any one of the first device 131, the second device 132, and the third device 133.

In some embodiments, the application 140 provides one or more Graphic User Interface (GUI) components (e.g., text areas or fields, radio buttons, checkboxes, drop-down menu). In various embodiments, at least some of the features and functions offered by the application 140 (e.g., text messaging, profile editing) are triggered and/or executed in full or in part based on user inputs and/or selections provided via the one or more GUI components. For example, the GUI can include radio buttons or drop-down menus that a user such as Alice can use to switch between different profiles. As another example, the GUI can display a text box, field, or area into which Alice can enter alpha numeric strings to compose her text messages to either Bob or Charlie. In various embodiments, the GUI is designed to resemble a conventional texting application or environment.

In various embodiments, the application 140 also provides an interface between a user and the platform 110. As described with respect to FIG. 1, in various embodiments, the platform 110 enables the user to establish, maintain, and utilize the multi-profile account. In various embodiments, at least some of the features and functions offered by the application 140 with respect to the multi-profile account are fully or partially implemented by the platform 110. FIG. 2 shows that in various embodiments, the platform 110 is in communication with the first device 131, the second device 132, and the third device 133. In various embodiments, after a user selects a particular feature or function via the application 140 (e.g., makes a selection using the GUI), the application sends corresponding request(s), instruction(s), and/or data to the platform 110. For example, in some embodiments, the application 140 will forward a text message originating from any one of the first device 131, the second device 132, and the third device 133 first to the platform 110 and the platform 110 then routes the text message to the appropriate destination device(s).

In various embodiments, text messages communicated between various users are not saved locally on any individual user's devices. Advantageously, providing a centralized (e.g., cloud) storage location for text messages is both more secure and enables users to access archived text messages from any device. Returning to an earlier example, in some embodiments, the text message from Alice to Bob is saved on neither Alice's nor Bob's mobile phones. Instead, in one exemplary embodiment, text messages communicated between various devices are saved by the platform 110 in the database 111. As will be discussed in more detail below, text messages are centrally archived by the platform 110 in the database 111. In the example, Alice sends Bob a text message from one of her devices shown in FIG. 2 (e.g., the first device 131, the second device 132, and the third device 133). On the one hand, in various embodiments, Alice's text message to Bob is first transmitted from her device to the platform 110 where it is routed to Bob's device. In addition, in various embodiments, the platform 110 will also save Alice's text message to Bob in Database 110.

Figure 3A:
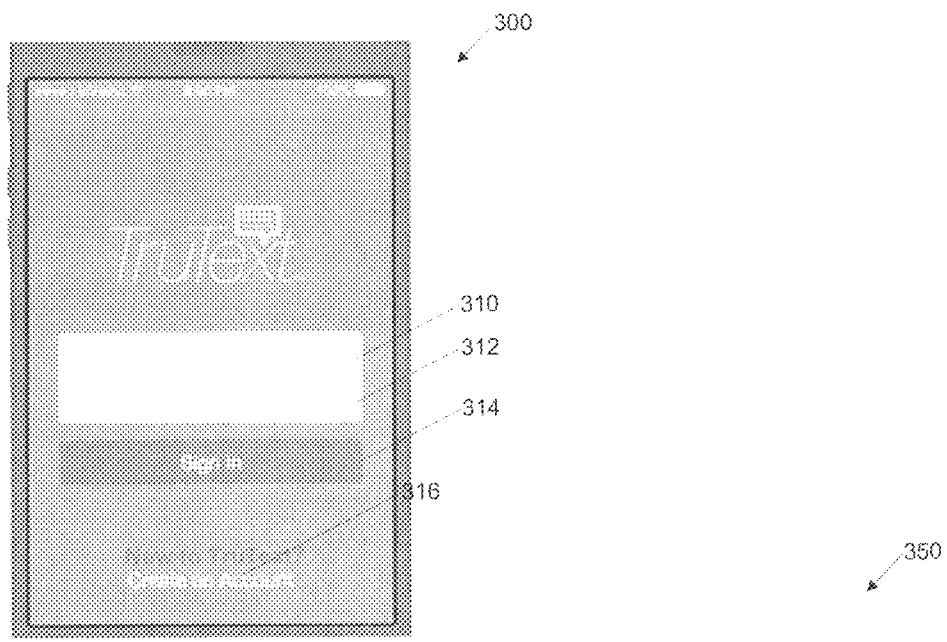
FIG. 3A illustrates a screen display according to various embodiments.

FIG. 3A illustrates a screen display 300 that can be used in implementing some embodiments of the systems and methods described herein. In various embodiments, the screen display 300 shown in FIG. 3A is displayed to users when the application 140 is initially launched. In various embodiments, the screen display 300 shown in FIG. 3A may be a sign-in screen displayed to users when the application 140 is initially launched on a device. As shown in FIG. 3A, the screen display 300 may include a variety of GUI components. For example, FIG. 3A shows a first text input field 310 to input an account or username, a second text input field 312 to input a password, and a "Sign In" button 314. Additionally, the screen display 300 can include a link 316 for new users who do not have an existing account to create a new account.

In various embodiments, a user can follow the link 316 to sign up or register for an account. In some embodiments, part of the initial sign up or registration process includes designation of one or more devices that will be used with the account. In various embodiments, the initial sign-up or registration process also includes designation of a unique name or handle for the account. In some embodiments, the platform 110 is configured to provide suggestions for an account name or handle in the event that a desired account name or handle is already in use by another subscriber to the service.

It is to be understood that in various embodiments, account names are separate and distinct from profile names or handles. In various embodiments, the platform 110 is able to analyze the accounts and profiles associated with various users, and decipher trends and identify commonalities amongst different user accounts and/or profiles. Additionally, in various embodiments, the platform 110 is configured to determine and suggest additional or alternate account and/or profile names or handles, including account and/or profile names or handles that complement a current or existing one. In some embodiments, the platform 110 suggests additional or alternate account and/or profile names or handles based on a user's characteristics (e.g., demographics). For example, suppose that Alice is a college graduate and is between 25-34 years old. In some exemplary embodiments, the platform 110 can determine that college graduates between the ages of 25-34 have one personal profile, one professional or business profile, and at least four disposable profiles. Thus, in some embodiments, the platform 110 can recommend that Alice create and reserve a similar set of profiles. Furthermore, in some embodiments, the platform 110 can further suggest to Alice names or handles for the personal, business, and disposable profiles.

Furthermore, in some embodiments, an account can be set up but remain dormant or inactive. In various embodiments, a user can pay a certain fee in order to delay account activation until a later date. In various embodiments, a user can pre-purchase one or more accounts and reserve the corresponding account names or handles in the process. In various exemplary embodiments, account and account names or handles can be sold, traded, or otherwise transferred from one user to another. In various embodiments, the platform 110 supports a secondary market for active and/or inactive user accounts.

Figure 3B:
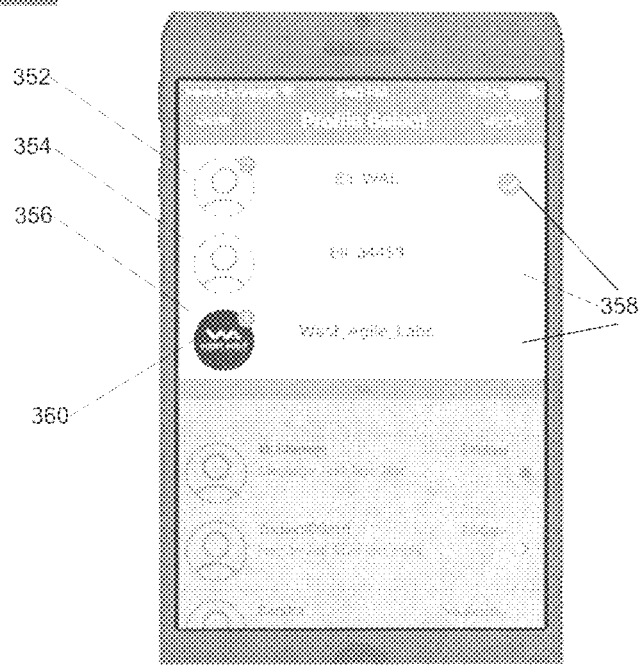
FIG. 3B illustrates a screen display according to various embodiments.

FIG. 3B illustrates a screen display 350 according to various embodiments. In various embodiments, the screen display 350 shown in FIG. 3B is a profile selection screen displayed to users who have already signed into their account using the application 140. As shown in FIG. 3B, in some embodiments, a selection of the names or handles at least some of a user's active and available profiles may be shown in the upper portion of the screen display 350. In some embodiments, a user can designate a default profile, which would be displayed upon initial login into the account. According to FIG. 3B, a user named Eli has a first profile 352 (i.e., Eli_WAL), a second profile 354 (i.e., Eli_34453), and a third profile 356 (i.e., West_Agile_Labs). As will be discussed in more detail below, FIG. 3B shows that the profiles may be classified differently. For example, the first profile 352 (i.e., Eli_WAL) may be classified as "Permanent," the second profile 354 (i.e., ELI_34453) may be classified as "Temporary," and the third profile 356 (i.e., West_Agile_Labs) may be classified as "Group." In addition, as will be discussed in more detail below, one or more profiles under an account can be designated as a business or commercial profile.

FIG. 3B further shows that the screen display 350 may one or more GUI components indicating the current selection of one or more profiles. For example, one or more radio buttons may appear next to each profile that allows Eli to select any one of his three profiles. In the screen display 350 shown in FIG. 3B, the first profile 352 (i.e., Eli_WAL) has been selected. As such, a corresponding selection of text messages communicated using that profile may be displayed in the lower portion of the profile selection screen.

Although only three profiles are shown in FIG. 3B, it is to be understood that in various other embodiments, Eli can simultaneously maintain any desired, required, or appropriate number of profiles. In some embodiments, Eli can designate one profile (e.g., El_WAL) as a default profile. In various embodiments, the default profile is automatically displayed each time Eli logs or signs into his account. In some embodiments, a user can have too many profiles to be displayed concurrently on a single screen. In those embodiments, a scrollbar GUI control component (not shown) may be added to the screen display 350 shown in FIG. 3B. Likewise, a separate scrollbar GUI control component (not shown) can also be provided to enable navigation through a large number of text messages in the lower portion of the sample screen shown in FIG. 3B.

In various embodiments, a user can customize one or more images to be displayed as part of a profile on the profile selection screen. For example, in FIG. 3B, a corporate logo 360 for West_Agile_Labs appears along with the company's profile. Although the sample screens shown in FIGS. 3A and 3B are adapted for smartphones (e.g., the second device 132), it is to be understood that similar screens are displayed on other types of devices, including but not limited to laptops (e.g., the first device 131) and tablet PCs (e.g., the third device 133).

Disposable Profiles

In various embodiments, an account represents a more permanent construct than the subordinate profiles. For example, the account Alice created when she initially subscribed to the service will persist unless she affirmatively cancels or revokes her subscription to the service. In contrast, as described with respect to FIG. 3B, some profiles under an account can be temporary. For example, in FIG. 3B, the Eli_34453 profile is a temporary profile while the Eli_WAL profile is a permanent one.

In various embodiments, a profile can be deliberately set as temporary or disposable. As shown in FIG. 3B, in various embodiments, there are at least three different types of profiles: permanent, temporary, and group. A user can, in various embodiments, set up a profile under an account as permanent, temporary, or group. Given the circumstances in one earlier example, Alice can set up a disposable profile (e.g., August.Garage.Sale@TruText.com) specifically to handle inquiries regarding her garage sale. In various embodiments, a disposable profile remains active or valid for only a limited period of time (e.g., 45 days). At the end of that time period, in various embodiments, any communication of text messages using that temporary or disposable profile will cease. Alice, for example, will no longer be able to send or receive text messages using her August.Garage.Sale@TruText.com profile once it expires.

In one exemplary embodiment, an expired temporary or disposable profile is first put on hiatus for a certain period time (e.g., 45 days) before it can be recycled for use by a new user. That is, in some exemplary embodiments, an expired temporary or disposable profile will remain unavailable or otherwise inactive for an additional length of time in order to prevent the profile's new user from inadvertently receiving text messages intended for the profile's old user. In addition, in some exemplary embodiments, users who attempt to send text messages to an expired temporary or disposable profile will receive an automatic response or notification (e.g., "This profile is not currently in use."). In various embodiments, an expired temporary or disposable account can also be renewed or extended for another period time, or converted to a permanent profile. It is to be understood that in various embodiments, a permanent profile does not expire automatically in the same manner as a temporary or disposable profile. However, in various embodiments, a permanent profile can still be deactivated or relinquished at any time without affecting the overall account. Furthermore, it is to be understood that profiles can be transacted between users. That is, in various embodiments, a profile can be sold, traded, or otherwise transferred from one account to another account. In various embodiments, the platform 110 supports a secondary market of user profiles.

Business Profiles

In various embodiments, in addition to permanent, temporary, and group profiles, one or more profiles under an account can also be designated as business profiles. In various embodiments, the application 140 gives users the option to set up or designate a profile as a business profile. In some embodiments, a profile can be designated or set up as a business profile in addition to being a permanent, temporary, or group profile. For example, in some embodiments, Alice's profile for her garage sale (e.g., August.Garage.Sale@TruText.com) can be both a temporary and a business profile.

In various embodiments, when a user designates a profile as business, the application 140 is configured to prompt the user to enter additional information regarding the business. In various embodiments, the user can be prompted to provide information that includes but is not limited to an address, hours of operation, phone numbers, web addresses, and mission statements. In various embodiments, the platform 110 is configured to generate and publish a directory (e.g., TruText Business Directory) based on information collected from a plurality of businesses. In some embodiments, individual business profiles can be linked to corresponding pages on one or more review sites (e.g., Yelp®, Zagat®, AngiesList™, and Better Business Bureau®).

In various embodiments, businesses are able to advertise their products and services via the platform 110 and through the services provided by the platform 110. In some exemplary embodiments, some or all of the selection, timing, content, and target audience of advertisements are determined dynamically. For example, in one embodiment, the platform 110 selectively pushes advertisements to a user's device via the application 140 based on the content of the text message(s) that the user has been sending and/or receiving. Suppose that Alice and Bob are texting one another to set up a lunch date. In one exemplary embodiment, the platform 110 analyzes some or all of the exchange between Alice and Bob to determine one or more relevant or appropriate advertisements for Alice and/or Bob. Since Alice and Bob are discussing a lunch date, in one exemplary embodiment, the platform 110 can determine to display to Alice and/or Bob advertisements for a local restaurant. Furthermore, in one exemplary embodiment, the advertisement can include a profile name or handle for the restaurant (e.g., Bistro@TruText.com) that either Alice or Bob can use to text in a reservation.

In some embodiments, a user can set up multi-level profile names or handles for personal or commercial uses. Advantageously, in some embodiments, multi-level profile names or handles enables a more precise routing of text message such as within an entity or organization (e.g., corporation, municipality). For instance, instead of simply a general profile name or handle for the restaurant in the previous example, the restaurant can elect more specific profile names or handles such as reservations@Bistro.TruText.com. In other examples, individual (i.e., non-business) users can also benefit from multi-level profile names or handles. Alice, in some embodiments, can set up profiles with names or handles such as friends@Alice.TruText.com, family@Alice.TruText.com, and classmates@Alice.TruText.com.

Hidden Profiles

In various embodiments, a user is able to create and utilize multiple profiles. Moreover, the profiles may be of different types including, for example, but not limited to, permanent, temporary, and group profiles. For example, the user Eli can select one of the first profile 352 (i.e., Eli_WAL), the second profile 354 (i.e., ELI_34453), and the third profile 356 (i.e., West_Agile_Labs) to communicate with other users using the selected profile as his identity.

In one exemplary embodiment, to protect a user's communication history from anyone who may be viewing the user's account, the user may elect to establish a profile that is designated as a hidden profile. In various embodiments, the texting history associated with a hidden profile is not directly accessible via the application 140. For example, hidden profiles are not listed with other types of profiles (e.g., permanent, temporary, business, group) and cannot be searched on an account level. Hidden profiles are also not listed on the user's account history. Individual text entries associated with hidden profiles cannot be moved and archived (e.g., by the platform 110 in the database 111).

Due to the secretive nature of a hidden profile, according to one exemplary embodiment, the existence and selection of a hidden profile cannot be indicated in an overt manner such as by using conventional GUI elements (e.g., radio buttons, dropdown menu, etc.). Instead, after a user creates a hidden profile (e.g., by selecting "hidden" as the type of profile), the profile will not be indicated or displayed when the user is signed into the user's account (e.g., as part of the screen display 350).

Figure 3C:
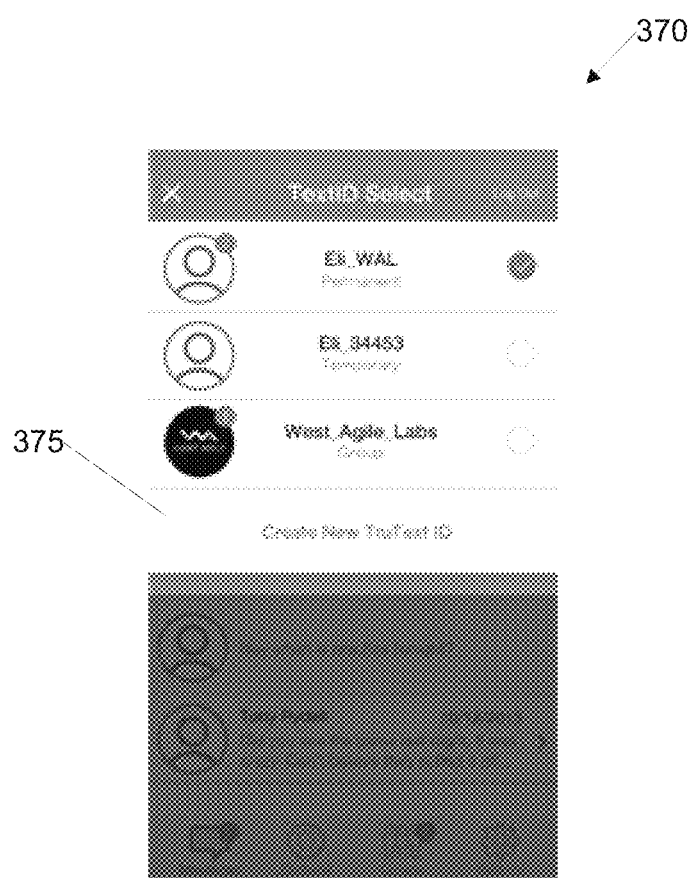
FIG. 3C illustrates a screen display according to various embodiments.

FIG. 3C illustrates a screen display 370 according to various embodiments. Referring to FIG. 3C, the screen display 370 may be a profile (or TextID) selection screen. In various embodiments, the screen display 370 may display one or more user profiles including, but not limited to, permanent profiles (i.e., Eli_WAL), temporary profiles (i.e., Eli_34453), and group profiles (i.e., West_Agile_Labs). As shown in FIG. 3C, the screen display 370 may include one or more GUI elements that allows a user to select one of the displayed profiles. For example, the screen display 370 includes radio buttons next to each profile. However, a person having ordinary skill in the art can appreciate that a different type of GUI element (e.g., a dropdown menu) may be used without departing from a scope of the present inventive concept.

According to one exemplary embodiment, to access a hidden profile, the user may initiate creation of a new profile such as by selecting an option 375 (i.e., "Create New TruText ID). Upon selection of the option 375, the user may be presented with a standard create screen. The user may input "hidden" followed by the name of the previously created hidden profile in order to select the hidden profile for use.

Group Text Messaging

In various embodiments, a "group administrator" (i.e., any user subscribed or registered with the platform 110) can create and designate at least one profile under an account as a group profile. In various embodiments, a single account can accommodate any desired, required, or appropriate number of group profiles. In various embodiments, one or more group profiles are set up in order for multiple users to engage in group text messaging. For example, a group profile can be set up in order for attendees of a large event (e.g., sporting match, concert) to exchange text messages with one another without having to reveal any personal contact information. Instead, the name or handle of group profile is disseminated or publicized to some or all of the attendees.

In various embodiments, a group profile can be configured to operate in one of at least three participation modes: broadcast mode, selective mode, and full participation mode. Suppose that a group administrator has created a group profile (e.g., NINERSvsCHARGERS@TruText.com) for fans at a football game. In some embodiments, the group profile can be set to the broadcast participation mode. As such, in some embodiments, only the group administrator will be able to send text messages to the group. Meanwhile, in those embodiments, all group members remain in "listen only" mode and are not permitted to send any text messages to the group. Alternately, in some embodiments, the group profile can be set in a selective mode. In those embodiments, the group administrator can allow at least some of the members in the group to send text messages to the group. In those embodiments, any number of group members (e.g., one or more) can have the privilege to broadcast text messages to the rest of the group while the remaining group members are in the "listen only" mode. Finally, in some embodiments, the group can be set in full participation mode in which case every group member is permitted to send text messages to the entire group.

Furthermore, in some embodiments, membership to join a group texting session can be open. Alternately, in some embodiments, a group administrator can impose partial or full restrictions (e.g., invitation or consent based) on group membership. Returning to the NINERSvsCHARGERS@TruText.com group profile described in the earlier example. In some embodiments, membership to that group can be open. This means that in some embodiments, any fan at the game can text a keyword (e.g., JOIN) to NINERSvsCHARGERS@TruText.com to become a member of the group. Conversely, group members can text a different keyword (e.g., DROP) to NINERSvsCHARGERS@TruText.com to leave the group. In various embodiments, text messages directed toward joining or leaving a group texting session are not broadcast or shared with the members of the group and do not become a part of the group's chat history, thread, or transcript.

In some embodiments, a group administrator is able to conduct a poll during a group texting session. In order to conduct a poll, the group administrator can include one or more questions in text messages broadcast to the group. For example, at the football game, the group administrator can send a text message to the NINERSvsCHARGERS@TruText.com group asking group members to nominate a MVP for the game. In one exemplary embodiment, text messages from group members in response to the poll question(s) are not broadcast to the entire group. That is, in one exemplary embodiment, individual responses are not shared with the group. However, in one exemplary embodiment, group members can view the collective responses or overall poll results (e.g., 32% Player A, 28% Player B, and 40% Player C).

In some embodiments, membership to join a group texting session can be made by invitation only. That is, in some embodiments, only users who have been specifically invited by a group administrator can become a member of the group. For example, the group administrator for the NINERSvsCHARGERS@TruText.com group can extend invitations to a select group of individuals (e.g., season pass holders) to join the group. In other embodiments, membership to a join a group texting session can be contingent upon the approval of the group administrator. For example, fans interested in communicating using the NINERSvsCHARGERS@TruText.com group profile must first submit a membership request to the group administrator and be approved by the group administrator in order to participate in the group texting session.

In various embodiments, group members have access to some or all of the group's chat transcript, thread, or history. In some embodiments, group members can view only a select portion (e.g., the most recent 20 minutes) of the group's chat transcript, thread, or history. In other embodiments, group members are given access to "sliding scale" sections of the group's chat transcript, thread, or history. For example, although fans that have joined the NINERSvsCHARGERS@TruText.com group texting session have access to the group's entire chat transcript, thread, or history, only 20-minute portions of the chat transcript, thread, or history can be viewed at any one time. It is to be understood that in various embodiments a group administrator has the ability to change one or both of participation and membership modes at any time. For example, the NINERSvsCHARGERS@TruText.com group can be set to operate in the broadcast mode during gameplay but the group administrator can change the group to operate in the full participation mode during breaks, time-outs, and halftime. In addition, although the foregoing examples describe a single group administrator, it is to be understood that in various other embodiments, any number of individuals can share group administrator duties, workload, or responsibilities. That is, in some embodiments, a group texting session can be managed and mediated by more than one group administrator.

Text Message Archive

As described earlier with respect to FIGS. 1 and 2, in various embodiments, the platform 110 is communicatively coupled with the database 111. In various embodiments, the platform 110 is configured to archive in the database 111 at least some of the text messages routed between users through the platform 110. For example, in various embodiments, the platform 110 archives partial or full threads, transcripts, or histories of the text messages exchanged between Alice and Bob. In fact, in various embodiments, the platform 110 archives at least some of the text messages that have been sent to and from some or all of a user's separate profiles. For instance, in various embodiments, the platform 110 archives the text massages that have been sent to and from Alice@TruText.com and Alice.Jones.Esq@TruText.com. As such, in various embodiments, a user like Alice can request to view any specific text message or sets of text messages from the archives maintained in the database 111.

In various embodiments, the application 140 provides an interface that enables the user to send requests to the platform 110 to retrieve one or more text messages archived in the database 111. In some embodiments, for example, the application 140 can provide a set of GUI control elements (e.g., scrollbar, radio buttons, checkboxes, etc.) that correspond to various archival functions. In some embodiments, in order to facilitate the user's selection process, the application 140 is configured display or present series and/or combinations of options that enable a user to choose individual text messages or groups of text messages. For instance, in some embodiments, the application 140 can prompt Alice to choose from different profiles (e.g., Alice@TruText.com, Alice.Jones.Esq@TruText.com), recipients (e.g., Bob, Charlie), and/or chronologies (e.g., dates, times). As one example, Alice can select, via the application 140, one or more text messages that were exchanged with Bob using her Alice@TruText.com profile. Alternately, in another example, Alice can request to view a series of text messages that she had exchanged with Charlie on a certain date (e.g., Aug. 22, 2014) and during a specified time period (e.g., 5-6 PM).

In various embodiments, a user's request to view a selection of earlier text messages is first transmitted to the platform 110. In various embodiments, the platform 110 processes and responds to the request for certain archived messages, including by retrieving the requested text messages from the database 111 and transmitting the requested text messages back to the user. In various embodiments, the application 140 is further configured to display the request selection of archived text messages to the user. In various embodiments, in addition or instead of retrieving and displaying archived text messages, the application 140 can provide a user the option to email or forward (via separate text message) a selection of one or more archived text messages.

In various embodiments, the application 140 further provides the option to save one or more archived text messages to a folder. In various embodiments, the user can choose either specific text messages or specific threads of text messages to add to a folder. In various embodiments, folders represent an organizational tool. For example, in some embodiments, Alice can create folders to store text messages between her and Charlie that pertain to specific work projects. It is to be understood that in at least some embodiments, storing one or more archived text messages to a folder merely creates a data reference or pointer to the original storage location of the one or more text messages in Database 110. That is, in some embodiments, storing an archived message to a folder does not generate an additional copy of the text message or cause a change in actual data storage location. In some embodiments, the application 140 provides each user at least one standard or default folder. In one exemplary embodiment, the application 140 additionally or alternately permits users to create one or more custom or personalized folders and/or sub-folders.

Non-Registered Users

In various embodiments, a registered user can both send and receive text messages from someone who is not registered to use the services provided by the platform 110. A non-registered sender can, in various embodiments, simply send a text or email message to a registered user using any one of the registered user's profile names or handles. Suppose Dave is not registered with the platform 110, in various embodiments, he would send a message to either Alice@TruText.com or Alice.Jones.Esq@TruText.com as he would a SMS text message or an email.

In some embodiments, a text message from a registered user to a non-registered recipient is delivered to the non-registered recipient as a conventional email or text message. That is, in some embodiments, the platform 110 acts as a gateway in routing the message between the two parties, including by converting the text message from the registered users into an email or a SMS text message. In other embodiments, instead of the actual message from the registered user, the platform 110 delivers instead a notification message to the non-registered recipient. In some embodiments, the notification message can include a portion of the original text message from the registered user. Alternately or in addition, in various embodiments, the notification message can include an invitation to the non-registered recipient to sign-up or register for the services provided by the platform 110. In some embodiments, in order to view the text message, a non-registered recipient must sign-up or register for the services provided by the platform 110. In other embodiments, a non-registered recipient can choose to bypass the sign-up or registration process. In one embodiment, instead of signing up or registering for the service, the non-registered recipient can request that the text message from the registered user be forwarded via an alternate medium (e.g., SMS text message, email). In another embodiment, the non-registered recipient can bypass the sign-up or registration, and still download and install a limited-function application in order to view the text message from the registered user. In various embodiments, the limited-function application is a condensed, abridged, or shell version of the application 140 (e.g., the application 140

Lite). In various embodiments, the lite version of the application 140 provides a limited roster of only basic functionalities such as viewing or replying to a text message from a registered user.

Figure 4:
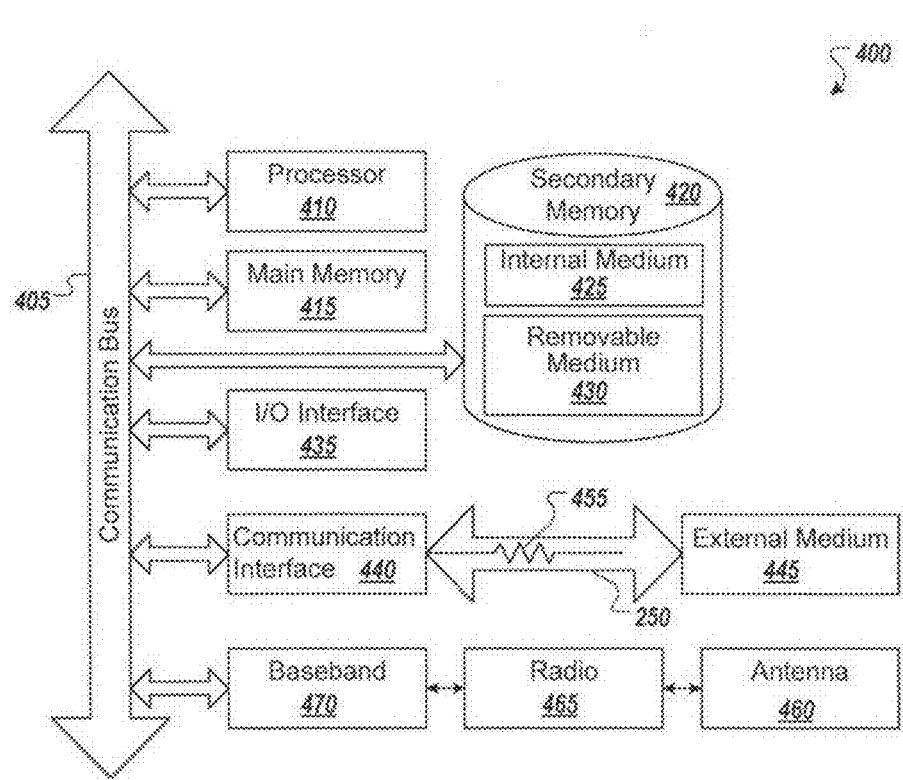
FIG. 4 is a block diagram illustrating a device according to various embodiments.

FIG. 4 is a block diagram illustrating a device 400 according to various embodiments. In some embodiments, the device 400 can be used to implement any of the first device 131, the second device 132, and the third device 133 described with respect to FIGS. 1 and 2. In various embodiments, the device 400 can be used as is or in conjunction with one or more of the mechanisms or processes described above, and can represent components of server(s), user system(s), and/or other devices described herein. The device 400 can be a server or any conventional personal computer, or any other processor-enabled device that is capable of wired or wireless data communication. Other computer systems and/or architectures can be also used, as will be clear to those skilled in the art.

The device 400 preferably includes one or more processors, such as a processor 410. Additional processors can be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors can be discrete processors or can be integrated with the processor 410. Examples of processors which can be used with the device 400 include, without limitation, the Pentium® processor, Core i7® processor, and Xeon® processor, all of which are available from Intel Corporation of Santa Clara, Calif.

the processor 410 is preferably connected to a communication bus 405. Communication Bus 405 can include a data channel for facilitating information transfer between storage and other peripheral components of the device 400. The communication bus 405 further can provide a set of signals used for communication with the processor 410, including a data bus, address bus, and control bus (not shown). The communication bus 405 can comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

The device 400 preferably includes a main memory 415 and can also include a secondary memory 420. The main memory 415 provides storage of instructions and data for programs executing on the processor 410, such as one or more of the functions and/or modules discussed above. It should be understood that programs stored in the memory and executed by the processor 410 can be written and/or compiled according to any suitable language, including without limitation C/C++, Java, JavaScript, Pearl, Visual Basic, .NET, and the like. The main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 420 can optionally include an internal memory 425 and/or a removable storage medium 430, for example a floppy disk drive, a magnetic tape drive, a compact disc (CD) drive, a digital versatile disc (DVD) drive, other optical drive, a flash memory drive, etc. The removable storage medium 430 is read from and/or written to in a well-known manner. The removable storage medium 430 can be, for example, a floppy disk, magnetic tape, CD, DVD, SD card, etc.

The removable storage medium 430 can be a non-transitory computer-readable medium having stored thereon computer executable code (i.e., software) and/or data (e.g., for implementing at least a portion of the subject matter described herein). The computer software or data stored on the removable storage medium 430 is read into the device 400 for execution by the processor 410.

In alternative embodiments, the secondary memory 420 can include other similar means for allowing computer programs or other data or instructions to be loaded into the device 400. Such means can include, for example, an external storage medium 445 and an interface 440. Examples of the external storage medium 445 can include an external hard disk drive or an external optical drive, or and external magneto-optical drive.

Other examples of the secondary memory 420 can include semiconductor-based memory such as programmable read-only memory (PROM), erasable programmable read-only memory (EPROM), electrically erasable read-only memory (EEPROM), or flash memory (block oriented memory similar to EEPROM). Also included are any other forms of the removable storage media 430 and the communication interface 440, which allow software and data to be transferred from an external medium 445 to the device 400.

The device 400 can include a communication interface 440. The communication interface 440 allows software and data to be transferred between the device 400 and external devices (e.g. printers), networks, or information sources. For example, computer software or executable code can be transferred to the device 400 from a network server via the communication interface 440. Examples of the communication interface 440 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing the device 400 with a network or another computing device.

The communication interface 440 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but can also implement customized or non-standard interface protocols as well.

Software and data transferred via the communication interface 440 are generally in the form of electrical communication signals 455. Such signals 455 are preferably provided to the communication interface 440 via a communication channel 450. In one embodiment, the communication channel 450 can be a wired or wireless network, or any variety of other communication links. The communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 415 and/or the secondary memory 420. Computer programs can also be received via the communication interface 440 and stored in the main memory 415 and/or the secondary memory 420. Such computer programs, when executed, enable the device 400 to perform the various functions, such as those described herein.

In this description, the term "computer readable medium" is used to refer to any non-transitory computer readable storage media used to provide computer executable code (e.g., software and computer programs) to the device 400. Examples of these media include the main memory 415, the secondary memory 420 (including the internal memory 425, the removable medium 430, and the external storage medium 445), and any peripheral device communicatively coupled with the communication interface 440 (including a network information server or other network device). These non-transitory computer readable mediums are means for providing executable code, programming instructions, and software to the device 400.

In an embodiment that is implemented using software, the software can be stored on a computer readable medium and loaded into the device 400 by way of the removable medium 430, an I/O interface 435, or a communication interface 440. In such an embodiment, the software is loaded into the device 400 in the form of electrical communication Signals 455. The software, when executed by the processor 410, preferably causes the processor 410 to perform the inventive features and functions previously described herein.

In an embodiment, the I/O interface 435 provides an interface between one or more components of the device 400 and one or more input and/or output devices. Example input devices include, without limitation, keyboards, touch screens or other touch-sensitive devices, biometric sensing devices, computer mice, trackballs, pen-based pointing devices, camera, microphone, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The device 400 also includes optional wireless communication components that facilitate wireless communication over a voice and over a data network. The wireless communication components can comprise an antenna system 460, a radio system 465, a baseband system 470, or any combination thereof. In the device 400, radio frequency (RF) signals are transmitted and received over the air by the antenna system 460 under the management of the radio system 465.

In one embodiment, the antenna system 460 can comprise one or more antennae and one or more multiplexors (not shown) that perform a switching function to provide the antenna system 460 with transmit and receive signal paths. In the receive path, received RF signals can be coupled from a multiplexor to a low noise amplifier (not shown) that amplifies the received RF signal and sends the amplified signal to the radio system 465.

In alternative embodiments, the radio system 465 can comprise one or more radios that are configured to communicate over various frequencies. In one embodiment, the radio system 465 can combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 465 to the baseband system 470.

If the received signal contains audio information, the baseband system 470 decodes the signal and converts it to an analog signal. Then the signal is amplified and sent to a speaker. The baseband system 470 also receives analog audio signals from a microphone. These analog audio signals are converted to digital signals and encoded by the baseband system 470. The baseband system 470 also codes the digital signals for transmission and generates a baseband transmit audio signal that is routed to the modulator portion of the radio system 465. The modulator mixes the baseband transmit audio signal with an RF carrier signal generating an RF transmit signal that is routed to the antenna system and can pass through a power amplifier (not shown). The power amplifier amplifies the RF transmit signal and routes it to the Antenna System 460 where the signal is switched to the antenna port for transmission.

The baseband system 470 is also communicatively coupled with the processor 410. The processor 410 has access to the main memory 415 and the secondary memory 420. The processor 410 is preferably configured to execute instructions (i.e., computer programs or software) that can be stored in the main memory 415 or the secondary memory 420. Computer programs can also be received from the baseband processor 460 and stored in the main memory 415 or in the secondary memory 420, or be executed upon receipt. Such computer programs, when executed, enable the device 400 to perform the various functions, such as those described herein. For example, the main memory 415 and secondary memory 420 can each include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 5:
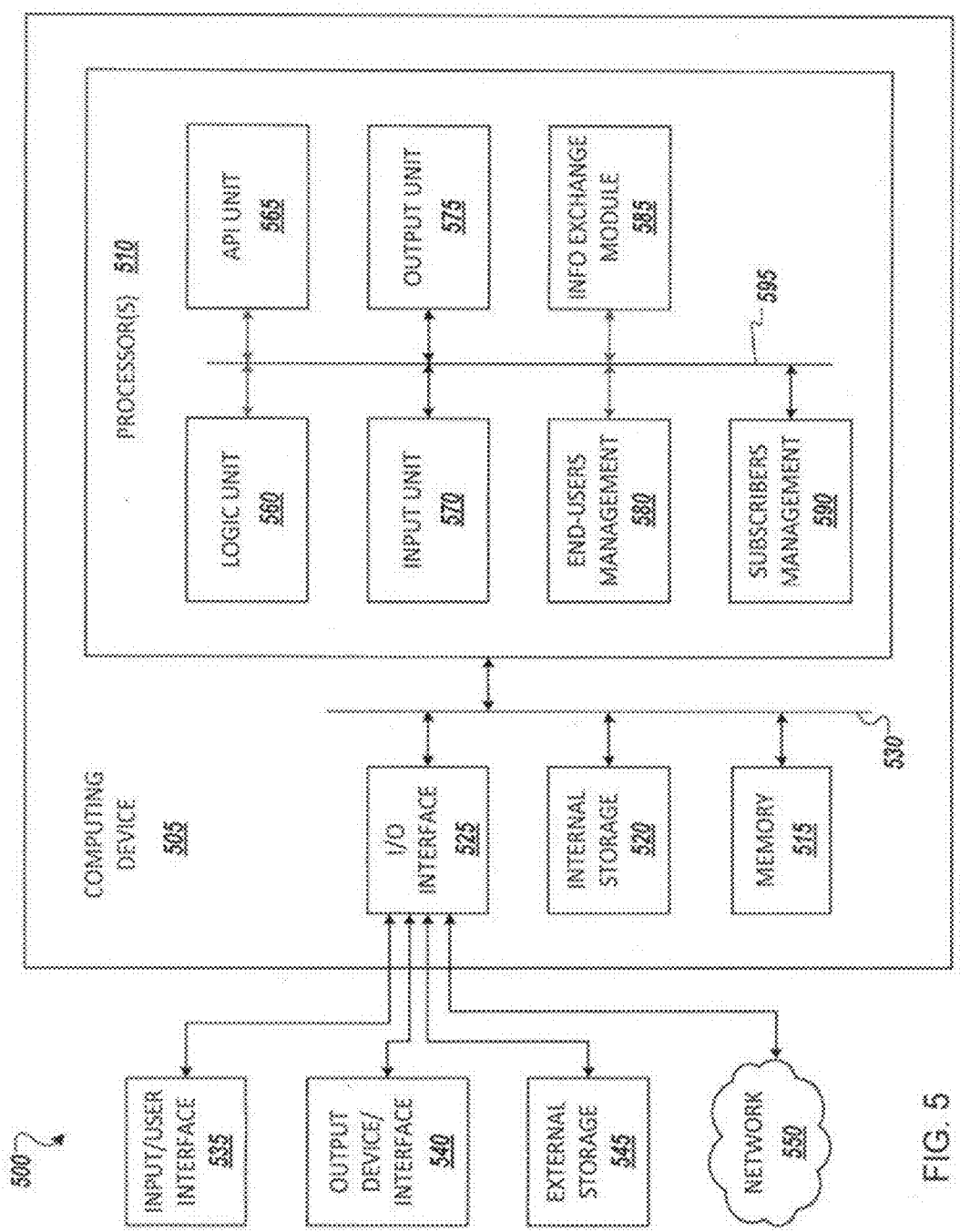
FIG. 5 is a block diagram illustrating a computing environment according to various embodiments.

FIG. 5 illustrates a computing environment 500 according to various embodiments. Referring to FIG. 5, in various embodiments, the computing environment 500 may include a Computing Device 505 (e.g., servers) that is suitable for use in some embodiments of the systems and methods described herein. One or more Computing Device 505 can be used to implement the platform 110. Computing Device 505 in Computing Environment 500 can include one or more processing units, cores, or Processors 510, Memory 515 (e.g., RAM, ROM, and/or the like), Internal Storage 520 (e.g., magnetic, optical, solid state storage, and/or organic), and/or I/O Interface 525, any of which can be coupled on a communication mechanism or Bus 530 for communicating information or embedded in the Computing Device 505.

Computing Device 505 can be communicatively coupled to Input/User Interface 535 and Output Device/Interface 540. Either one or both of Input/User Interface 535 and Output Device/Interface 540 can be a wired or wireless interface and can be detachable. Input/User Interface 535 can include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output Device/Interface 540 can include a display, television, monitor, printer, speaker, braille, or the like. In some example implementations, Input/User Interface 535 and Output Device/Interface 540 can be embedded with or physically coupled to Computing Device 505. In other example implementations, other computing devices can function as or provide the functions of Input/User Interface 535 and Output Device/Interface 540 for Computing Device 505.

Examples of Computing Device 505 can include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing Device 505 can be communicatively coupled (e.g., via I/O Interface 525) to External Storage 545 and Network 550 for communicating with any number of networked components, devices, and systems, including one or more computing devices of the same or different configuration. Computing Device 505 or any connected computing device can be functioning as, providing services of, or referred to as a server, client, thin server, general machine, special-purpose machine, or another label.

I/O Interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in Computing Environment 500. Network 550 can be any network or combination of networks (e.g., the Internet, local area network, wide area network, a telephonic network, a cellular network, satellite network, and the like).

Computing Device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing Device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include Logic Unit 560, Application Programming Interface (API) unit 565, Input Unit 570, Output Unit 575, User Management 580, Information Exchange Module 585, and Database 590, Inter-Unit Communication Mechanism 595 for the different units to communicate with each other, with the OS, and with other applications (not shown). The described units and elements can be varied in design, function, configuration, or implementation and are not limited to the descriptions provided.

In some example implementations, when information or an execution instruction is received by API Unit 565, it can be communicated to one or more other units (e.g., Logic Unit 560, Input Unit 570, Output Unit 575, User Management 580, Information Exchange Module 585, and Database 590). For example, after Input Unit 570 has received, via Network 550, device MAC addresses and/or user information, Input Unit 570 can use API Unit 565 to communicate the information to User Management 580. User Management 580 can, via API Unit 565, interact with the Logic Unit 360 to store or update in Database 590 correlated data between individual user information and corresponding MAC addresses of each user's device. User Management 580 also can, via API Unit 565, interact with Logic Unit 360 to retrieve from Database 590 individual user information that corresponds to specific device MAC addresses. Output Unit 575 can subsequently transmit the individual user information via Network 550.

In some instances, Logic Unit 560 can be configured to control the information flow among the units and direct the services provided by API Unit 565, Input Unit 570, Output Unit 575, User Management 580, and Database 590. For example, the flow of one or more processes or implementations can be controlled by Logic Unit 560 alone or in conjunction with API Unit 565.

In situations in which the systems discussed here collect personal information about users, or can make use of personal information, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes can be made in these example implementations without departing from the subject matter described herein as defined in the appended claims and their equivalents.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A system for managing communications across a plurality of identities, the system comprising:

a messaging server comprising a processor and a memory coupled to the processor and configured to provide the processor with instructions, wherein the processor is configured to:
receive, from a communication device of a first user, a request to create a first account;
create, in response to one or more indications from the first user, a first profile, a second profile, and a third profile associated with the first account,
display indications of the first profile, the second profile, and the third profile on a graphical user interface (GUI) of the communication device of the first user;
receive a plurality of messages from the communication device of the first user;
transmit at least one of the plurality of messages from the first user using each of the first profile, the second profile, and the third profile; and
archive the plurality of messages;
wherein the first profile is a permanent profile that does not expire, the second profile is a temporary profile that expires after a specified period of time, and the third profile is a group profile configured to support communication among a plurality of users included in a group.

2. The system of claim 1, wherein the communication device of the first user comprises a plurality of communication devices.

3. The system of claim 2, wherein the processor is further configured to register the plurality of communication devices for use with the first account.

4. The system of claim 2, wherein the first profile, the second profile, and the third profile are accessible by the first user using any one of the plurality of communication devices.

5. The system of claim 1, wherein the permanent profile is a hidden profile.

6. The system of claim 5, wherein the processor is configured to recognize a specified procedure prior to displaying the hidden profile on the GUI of the communication device of the first user.

7. The system of claim 5, wherein the processor is configured to not archive messages from the plurality of messages transmitted or received with the hidden profile.

8. The system of claim 1, wherein:
the permanent profile is a business profile, and
the business profile comprises multi-level profile names configured to route messages to specific entities within a business.

9. The system of claim 1, wherein the processor is configured to convert a message received from the communication device of the first user from a first format to a second format and deliver the message to a recipient in the second format.

10. The system of claim 9, wherein the processor is configured to automatically convert the message received from the communication device of the first user from the first format to the second format based upon predetermined criteria.

11. A method for managing communications across a plurality of identities, the method comprising:

receiving, from a communication device of a first user, a request to create a first account;
creating with a processor, in response to one or more indications from the first user, a first profile, a second profile, and a third profile associated with the first account,
displaying indications of the first profile, the second profile, and the third profile on a graphical user interface (GUI) of the communication device of the first user;
receiving a plurality of messages from the communication device of the first user;
transmitting at least one of the plurality of messages from the first user using each of the first profile, the second profile, and the third profile; and
archiving the plurality of messages;
wherein the first profile is a permanent profile that does not expire, the second profile is a temporary profile that expires after a specified period of time, and the third profile is a group profile configured to support communication among a plurality of users included in a group.

12. The method of claim 11, wherein the communication device of the first user comprises a plurality of communication devices.

13. The method of claim 12, further comprising:
registering, with the processor, the plurality of communication devices for use with the first account.

14. The method of claim 12, further comprising:
causing, by the processor, the first profile, the second profile, and the third profile to be accessible by the first user using any one of the plurality of communication devices.

15. The method of claim 11, further comprising:
creating the permanent profile as a hidden profile.

16. The method of claim 15, further comprising:
recognizing, by the processor, a specified procedure prior to displaying the hidden profile on the GUI of the communication device of the first user.

17. The method of claim 15, further comprising:
restricting the processor from archiving messages from the plurality of messages transmitted or received with the hidden profile.

18. The method of claim 11, further comprising:
creating the permanent profile as a business profile, and creating multi-level profile names for the business profile to route messages to specific entities within a business.

19. The method of claim 11, further comprising:
converting, with the processor, a message received from the communication device of the first user from a first format to a second format and deliver the message to a recipient in the second format.

20. The method of claim 19, further comprising:
automatically converting, with the processor, the message received from the communication device of the first user from the first format to the second format based upon predetermined criteria.

\* \* \* \* \*